3,305,059
TRANSVERSELY ACTUATED FLUID CLUTCH
Donald C. Hutchinson, Rte. 1, Box 46, Tickfaw, La. 70466; and George M. Wylie, 706 N. Magnolia, and William J. Wylie, Sr., 410 N. Oak St., both of Hammond, La. 70401
Filed Mar. 1, 1965, Ser. No. 436,218
3 Claims. (Cl. 192—60)

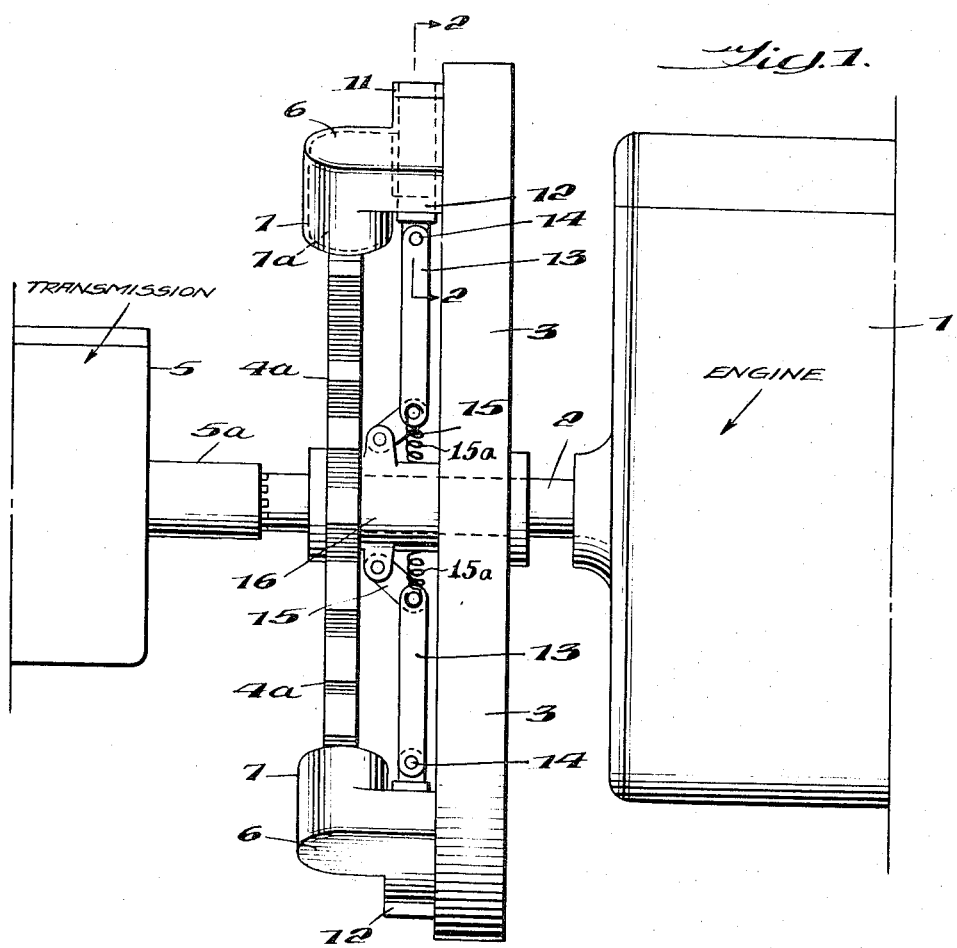

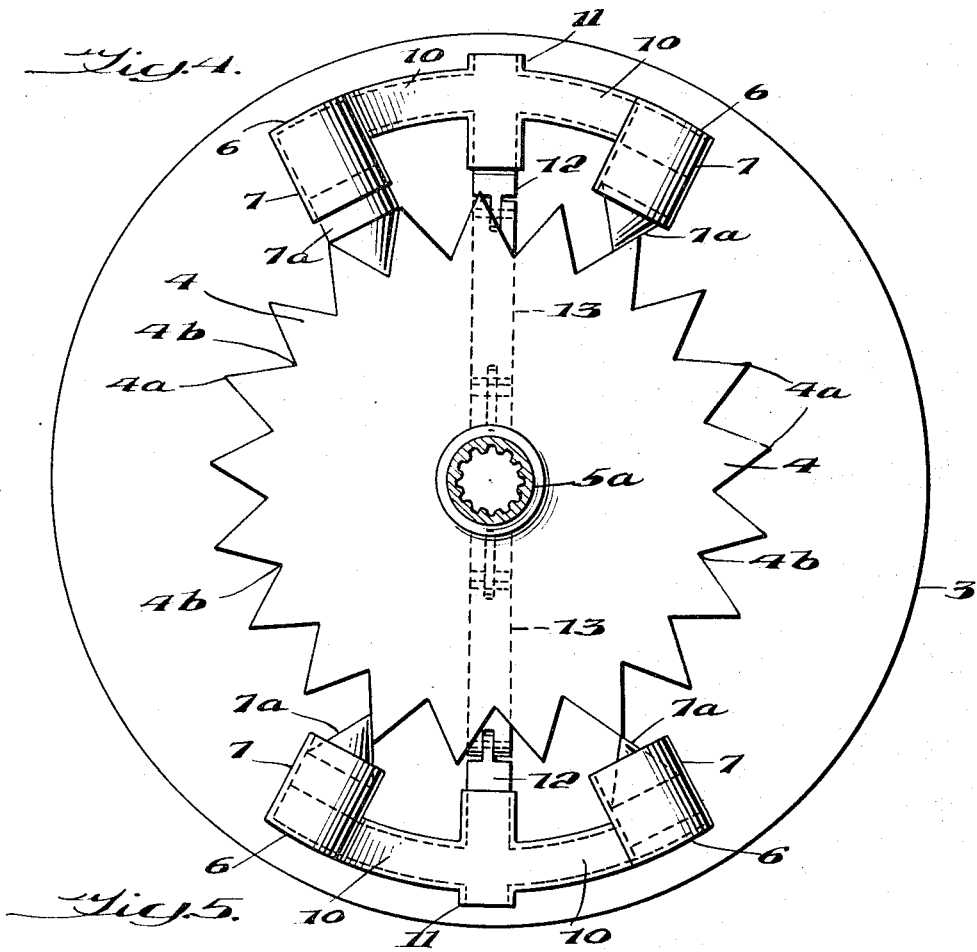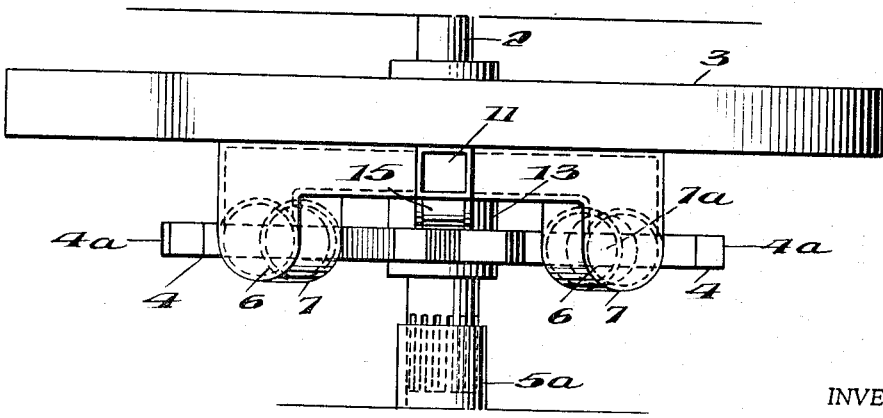

This invention relates to mechanism for the transmission of power from a source to the selected work and includes an improved clutch.

One of the features of this mechanism pertains to the transmission of power automatically from a driving member to a driven member and thence to a drive shaft. In this relation, pistons attached to a flywheel provide the automatic drive function. In the preferred arrangement, two sets of pistons attached to the flywheel in pairs provide the automatic drive function.

The pistons are identical in volume and they are connected in pairs by a transfer tube, one pair being located at one side of the axial center of a flywheel and the other pair being located on the opposite side of said axial center. Between the pistons of each pair there is a connecting tube containing a fluid which is pushed back and forth depending on the position of the pistons. The pistons ride on the notched peripheral surface of a rotor member which moves in the same axial center as the flywheel. The movement of the pistons on the rotor member drives the rotor member. In the middle of each pair of pistons the tube is provided with an orifice sliding plate slidable radially which opens and closes a port by means of a governor responsive to the flywheel. When the port is open and the fluid in the tube can move freely from one end to the other, and from one piston to the other, the rotor is not moving. As the port begins to close, a drag is put on the teeth of the rotor and it starts to turn. When the port is completely shut off, and the liquid is unable to move from one end of the tube to the other, the pistons lock the flywheel and rotor together so that they turn as a single unit.

This structure comprises an equibalanced drive assembly and is readily adaptable to automobiles. The simplicity of design and the solid coupling features render it economical to build and the solid lock-up between the driving and driven parts provides for improved gas mileage when those parts are in direct drive.

The foregoing and additional features and advantages inherent to this construction will be further explained, and set forth in the following specification and claims when considered in conjunction with the attached drawings, in which:

FIG. 1 is a side view showing an engine, a flywheel, a rotor wheel with a governor between the flywheel and rotor wheel, and all of which serves to transmit power from the engine to the transmission;

FIG. 2 is a cross sectional view on the line 2—2 of FIG. 1 through the orifice sliding valve at the upper end of the connection to the governor;

FIG. 3 is a cross sectional view taken on the line 3—3 of FIG. 2, showing the orifice in open position;

FIG. 4 is an elevational view looking at one face of the rotor wheel, the flywheel being shown behind it, the rotor wheel having its projecting teeth and intervening valleys between the apices of the teeth. This view also shows the pistons carried by the flywheel at opposite ends of the connecting tube between the pistons;

FIG. 5 is a plan view looking down on the structure shown in FIG. 4.

Referring in detail to the mechanism shown in FIGS. 1–5 inclusive, 1 represents an engine block, 2 is the crank shaft projecting from the engine block. 3 is the flywheel which is rotatable with the crankshaft. 4 is the rotor wheel with alternate teeth formed with apices 4a and valleys 4b. 5 indicates a transmission housing having a shaft 5a axially centered with respect to the crankshaft 2, flywheel 3 and rotor wheel 4.

6 indicates the heads of the cylinders having side walls 7 and pistons 7a. Each pair of pistons are mounted on the flywheel and so related with respect to the rotor wheel 4 that the pistons move slidably over the surface of the teeth in the rotor wheels. Thus the advance end of one piston can be in a valley 4b of the rotor wheel while the opposite piston of the same pair of pistons is adjacent the apex 4a of a tooth or vice versa.

As shown in FIG. 1, the piston cylinder and assembly 6, 7 and 7a is located above the rotor wheel and similar piston cylinder and assembly is shown at 6 and 7 at a lower position beneath the flywheel axis. In FIG. 4, the set of pistons shown above the axial center is duplicated at the bottom below the axial center with cylinder and piston assembly.

Between each pair of pistons and piston cylinders is a transfer tube 10 which is adapted to contain fluid to be forced back and forth from one piston to the other of each set. Each piston is identical in volume. Midway of the length of the tube 10 is a guideway 11 in which is mounted an orifice sliding plate 12 having a port 12a therethrough. As shown in FIG. 2, the orifice sliding plate 12 is in an uppermost position and the port opening 12a therethrough is in line with the bore of the tube 10 so that the liquid in the tube may be passed from cylinder to cylinder of each pair.

The end of the orifice sliding plate nearest the axial center is connected by a rod 13 and clevis pin 14 and a further linkage 15 to a governor 16 attached to the flywheel 3. These combined parts react to the centrifugal force established when the flywheel and the orifice sliding plate are revolved with the flywheel.

The governor 16 is of the centrifugal weight type and is mounted to the center of the flywheel. When the engine begins to turn the flywheel, the weights, including the rods 13 and linkage 15, begin to move out and away from the center of the flywheel. This action of the weights moving outward pushes a connecting rod 13 which is attached at one end to the arm of the centrifugal weight and at the other end to the orifice sliding plate 12. As the sliding plate 12 is pushed up it closes off the passage of fluid from one piston assembly to the other piston assembly. When fluid can no longer pass from one piston assembly to the other piston assembly the pistons are then locked in a stationary position and cause the flywheel and rotor member to turn together as a single unit at a one to one ratio. This governor, like all centrifugal weight governors, moves outward by centrifugal force and is returned to its rest position by return springs when centrifugal force stops or is greatly reduced. Such return springs are indicated at 15a.

The following is a step-by-step description of the operation of the above described apparatus. As the flywheel 3 begins to turn under the influence of the engine and its crankshaft, the sets of pistons 7a are moved over the surface of the teeth of the rotor wheel 4. The pistons are so arranged that one in each pair is in the valley 4b between the teeth and one of each pair is on the crown or apex 4a of the rotor teeth. Each pair of pistons transfers fluid through the connecting tubes 10 and through the orifice sliding plates 12. Inasmuch as the pistons are of the same size and since one piston of a set is always advanced when the other is retracted, the rotor teeth simply cause the pistons to transfer fluid from one piston cylinder to the other. As the orifice sliding plate 12 begins to move by action of the governor 16 and to close off the openings 12ª, the fluid in the tubes 10 begins to be trapped on a single side of the piston. This restricting action causes a drag to be applied to the rotor teeth as the pistons continue to pump the fluid from cylinder to cylinder. The more nearly the orifice port 12ª is closed off, the heavier becomes the drag until the orifice port closes off completely and at this stage the lock-up between the flywheel and the rotor wheel becomes complete and those two parts tend to turn as a single unit with a one to one ratio. This completes the forward cycle. Any slowing down or stopping will reverse the action from a partial pull as under reduced speed to a neutral action as when the engine is idling.

Whereas there has been a tendency for a certain amount of slippage between present day motor car driving systems in transmitting power from the engine to the transmission and vehicle wheels, the above described mechanism by locking the rotor member to the flywheel serves to prevent lost motion and slippage and thus conserves fuel and power.

We claim:

1. An automatic drive device for use between an engine and a transmission, comprising a flywheel driven by the engine, a rotor wheel mounted on the same axis with the flywheel and spaced therefrom and in driving relation to the transmission, said rotor wheel having its peripheral edge provided with a series of teeth therearound providing alternately valleys and apices, an extension from said flywheel contacting said rotor wheel to rotate the later and having a first set of two pistons spaced from each other on one side of the axis of rotation of said flywheel and a second set of two pistons on the opposite side of rotation of said flywheel, certain of said pistons of a set frictionally engaging the rotor wheel teeth at a valley when the other piston of said same set is at the apex of a different tooth, whereby the rotor wheel is turned as the flywheel is moved, a tube providing a communication between said pistons of each set and said pistons serving to force liquid back and forth through said tube, and a valve mounted intermediate the length of each said tube to regulate the movement of liquid lengthwise of said tube, a governor located between said flywheel and said rotor wheel and axially with respect thereto and responsive to centrifugal force, and a connection between said governor and each said valve whereby rotation of said engine affects the opening and closing of said valve.

2. An automatic drive device for use between an engine and a transmission, comprising a flywheel driven by the engine, a rotor wheel mounted on the same axis with the flywheel and spaced therefrom and in driving relation to the transmission, said rotor wheel having its peripheral edge provided with a series of teeth therearound providing alternately valleys and apices, an extension from said flywheel contacting said rotor wheel to rotate the latter and having two pistons spaced from each other, one of said pistons frictionally engaging the rotor wheel teeth at a valley when the other piston is at the apex of a different tooth, whereby the rotor wheel is turned as the flywheel is moved, a tube providing a communication between said pistons and said pistons serving to force liquid back and forth through said tube, and a valve mounted intermediate the length of said tube to regulate the movement of liquid lengthwise of said tube, a governor located between said flywheel and said rotor wheel and axially with respect thereto and responsive to centrifugal force, and a connection between said governor and said valve whereby rotation of said engine affects the opening and closing of said valve, said pistons serving to drag said rotor wheel rotatably when said flywheel moves said pistons against the slope of said teeth.

3. An automatic drive device for use between an engine and a transmission, comprising a flywheel driven by the engine, a rotor wheel mounted on the same axis with the flywheel and spaced therefrom and in driving relation to the transmission, said rotor wheel having its peripheral edge provided with a series of teeth therearound providing alternately valleys and apieces, an extension from said flywheel contacting said rotor wheel to rotate the latter and having a first set of two pistons spaced from each other on one side of the axis of rotation of said flywheel and a second set of two pistons on the opposite side of rotation of said flywheel, certain of said pistons of a set frictionally engaging the rotor wheel teeth at a valley when the other piston of said same set is at the apex of a different tooth, whereby the rotor wheel is turned as the flywheel is moved, a tube providing a communication between said pistons of each set and said pistons serving to force liquid back and forth through said tube, and a valve mounted intermediate the length of each said tube to regulate the movement of liquid lengthwise of said tube and including a slidable plate, linkage between said slidable plate and said flywheel responsive to centrifugal force, said slidable plate and linkage constituting governor means whereby rotation of said flywheel effects the opening and closing of said valve, said pistons serving to drag said rotor member rotatably when said flywheel moves said pistons against the surfaces of said teeth.

References Cited by the Examiner

UNITED STATES PATENTS

| | | | |
|---|---|---|---|
| 1,485,802 | 3/1924 | Morlan | 188—91 |
| 1,866,266 | 7/1932 | Nettel | 192—60 |
| 2,177,210 | 10/1939 | Emerson | 192—60 |

DAVID J. WILLIAMOWSKY, *Primary Examiner.*

A. T. McKEON, *Assistant Examiner.*